(12) United States Patent
Yano (10) Patent No.: US 11,398,632 B2
(45) Date of Patent: Jul. 26, 2022

(54) FUEL-CELL VEHICLE

(71) Applicant: TOYOTA JIDOSHA KABUSHIKI KAISHA, Toyota (JP)

(72) Inventor: Masaya Yano, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/897,450

(22) Filed: Jun. 10, 2020

(65) Prior Publication Data

US 2021/0043951 A1 Feb. 11, 2021

(30) Foreign Application Priority Data

Aug. 7, 2019 (JP) .............................. JP2019-145194

(51) Int. Cl.
| | | |
|---|---|---|
| *H01M 8/04029* | (2016.01) | |
| *G05D 23/19* | (2006.01) | |
| *H01M 8/0432* | (2016.01) | |
| *H01M 8/04007* | (2016.01) | |
| *B60H 1/22* | (2006.01) | |
| *H01M 8/04537* | (2016.01) | |

(52) U.S. Cl.
CPC ...... *H01M 8/04029* (2013.01); *B60H 1/2215* (2013.01); *G05D 23/19* (2013.01); *H01M 8/04067* (2013.01); *H01M 8/04358* (2013.01); *H01M 8/04619* (2013.01); *H01M 2250/20* (2013.01)

(58) Field of Classification Search
CPC ........ B60H 1/2215; B60K 11/02; B60K 1/00; B60L 2240/662; B60L 50/72; B60L 58/34; B60Y 2400/202; G05D 23/19; H01M 16/006; H01M 2250/20; H01M 8/04029; H01M 8/04067; H01M 8/04074; H01M 8/04268; H01M 8/04302; H01M 8/04358; H01M 8/04619; H01M 8/04701; Y02E 60/50; Y02T 90/40
See application file for complete search history.

(56) References Cited

U.S. PATENT DOCUMENTS

| | | | | |
|---|---|---|---|---|
| 2006/0147772 A1* | 7/2006 | Takemoto | ......... | H01M 8/04007 429/429 |
| 2010/0098979 A1* | 4/2010 | Imamura | ........... | H01M 8/04952 429/431 |

FOREIGN PATENT DOCUMENTS

| | | | | |
|---|---|---|---|---|
| JP | 2007265857 A | * | 10/2007 | .............. H01M 8/04 |
| JP | 2008218289 A | * | 9/2008 | .............. H01M 8/00 |
| JP | 2014143070 A | | 8/2014 | |

OTHER PUBLICATIONS

Machine Translation JP2007265857A (Year: 2007).*
Machine Translation JP2008218289A (Year: 2008).*

* cited by examiner

*Primary Examiner* — Victoria H Lynch
(74) *Attorney, Agent, or Firm* — Dickinson Wright, PLLC (57) ABSTRACT

A fuel-cell vehicle in which a fuel cell which is a driving power source is mounted includes a refrigerant flow passage that is connected to the fuel cell, a first pump that causes a refrigerant to flow in the refrigerant flow passage, a heater that heats the refrigerant, and a connection part that is electrically connected to the heater and the first pump and that is used for electrical connection to an external power source which is provided outside the fuel-cell vehicle. The heater and the first pump are driven with electric power supplied from the external power source which is connected thereto via the connection part.

5 Claims, 3 Drawing Sheets

FUEL-CELL VEHICLE

INCORPORATION BY REFERENCE

The disclosure of Japanese Patent Application No. 2019-145194 filed on Aug. 7, 2019 including the specification, drawings and abstract is incorporated herein by reference in its entirety.

BACKGROUND

1. Technical Field

The disclosure relates to a fuel-cell vehicle.

2. Description of Related Art

As a method of starting a fuel cell in an environment with a low temperature such as a sub-zero temperature, a configuration in which a heater operating with an external power source is provided in a refrigerant inlet part of a fuel-cell stack and a fuel cell is heated by the heater at the time of starting at a low temperature has been proposed (for example, see Japanese Unexamined Patent Application Publication No. 2014-143070 (JP 2014-143070 A)). Specifically, a method for efficiently heating a refrigerant near a heater by performing heating using the heater in a state in which a refrigerant pump provided in a refrigerant flow passage is stopped and the refrigerant heated with the heater is supplied to a fuel cell by driving the refrigerant pump has been proposed.

SUMMARY

However, when electric power of an onboard battery is used to drive the refrigerant pump at the time of starting at a low temperature, there is a likelihood that the heated refrigerant will not be supplied to the fuel cell due to a shortage of electric power for driving the refrigerant pump and the temperature of the fuel cell will increase insufficiently, if the state of charge (SOC) of the battery is low.

The disclosure can be embodied in the following aspects.

(1) According to an aspect of the disclosure, there is provided a fuel-cell vehicle in which a fuel cell which is a driving power source is mounted. The fuel-cell vehicle includes: a refrigerant flow passage that is connected to the fuel cell; a first pump that causes a refrigerant to flow in the refrigerant flow passage; a heater that heats the refrigerant; and a connection part that is electrically connected to the heater and the first pump and that is used for electrical connection to an external power source which is provided outside the fuel-cell vehicle. The heater and the first pump are driven with electric power supplied from the external power source which is connected thereto via the connection part.

With the fuel-cell vehicle according to this aspect, it is possible to heat the fuel cell by driving the heater and the first pump using the external power source to heat the refrigerant before the fuel-cell vehicle is started in a low-temperature environment. Accordingly, it is possible to rapidly increase the temperature of the fuel cell at the time of starting at a low temperature.

(2) In the fuel-cell vehicle according to the aspect, the first pump and the heater may be provided in the refrigerant flow passage with an attachment part provided in the refrigerant flow passage. With the fuel-cell vehicle according to this aspect, cold-area specifications including those of the heater and the first pump can be set in the fuel-cell vehicle and vehicles of a plurality of grades including cold-area specifications can be easily prepared.

(3) The fuel-cell vehicle according to the aspect may further include a radiator that cools the refrigerant, the refrigerant flow passage may include: a main flow passage that causes the refrigerant to circulate between the fuel cell and the radiator; and a bypass flow passage of which both ends are connected to the main flow passage, which causes the refrigerant to flow by bypassing the radiator, and in which the heater and the first pump are provided, and the attachment part may be provided in a branching part at which the bypass flow passage branches from the main flow passage. In the fuel-cell vehicle according to this aspect, since the heater and the first pump are provided in the bypass flow passage, it is possible to cause the refrigerant to flow by bypassing the radiator and to enhance efficiency of heating the refrigerant using the heater when the refrigerant is heated using the heater. When the second pump is driven at the time of generation of electric power in the fuel cell, it is possible to prevent the first pump from causing flow passage resistance by preventing flow of the refrigerant in the bypass flow passage and causing the refrigerant to flow in the main flow passage and to curb an increase in power consumption of the second pump.

(4) In the fuel-cell vehicle according to the aspect, the attachment part may be provided in a switching valve that switches a flow of the refrigerant between the main flow passage and the bypass flow passage. With the fuel-cell vehicle according to this aspect, it is possible to easily attach and detach the heater and the first pump to and from the main flow passage for each bypass flow passage.

(5) The fuel-cell vehicle according to the aspect may further include: a power storage device that is chargeable and dischargeable; and a second pump that is supplied with electric power from at least one of the power storage device and the fuel cell and that causes the refrigerant to flow in the refrigerant flow passage. An output voltage of the external power source may be lower than an operating voltage of the second pump. With the fuel-cell vehicle according to this aspect, it is possible to curb power consumption of the external power source by curbing a voltage in a line for connection of the connection part to the external power source and to cause the refrigerant to flow in the refrigerant flow passage using the first pump.

(6) In the fuel-cell vehicle according to the aspect, the external power source may be a commercial power source. With the fuel-cell vehicle according to this aspect, it is possible to easily secure a power source for the heater and the first pump.

The disclosure can also be embodied in various forms other than the fuel-cell vehicle. For example, the disclosure can be embodied in the form of a method of assisting with a warming-up operation in a fuel-cell vehicle, a control method for a fuel-cell vehicle, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Overall Configuration of Fuel-Cell Vehicle

Figure 1:
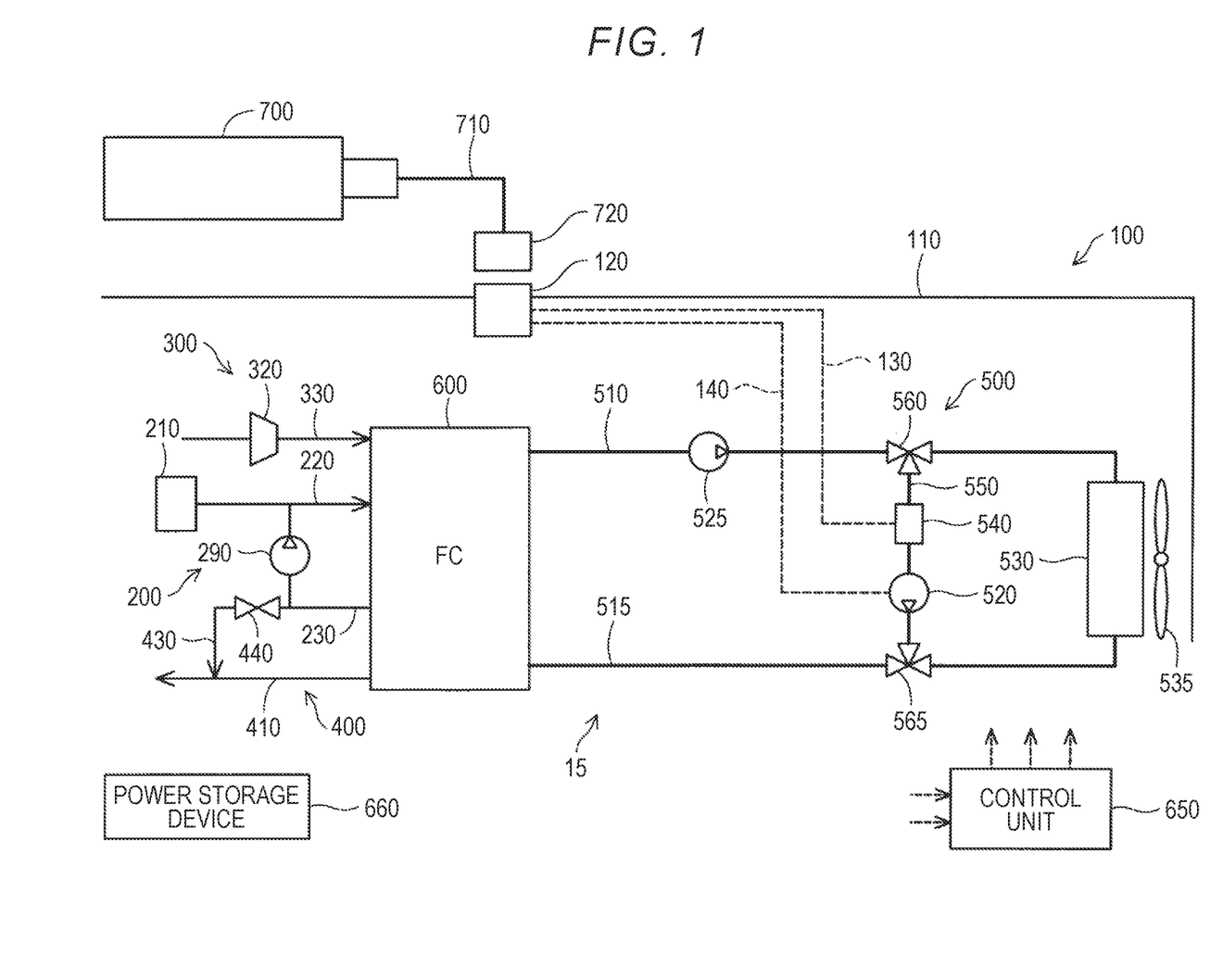
FIG. 1 is a diagram schematically illustrating a configuration of a fuel-cell vehicle.

FIG. 1 is a diagram schematically illustrating a configuration of a fuel-cell vehicle 100 according to an embodiment of the disclosure. The fuel-cell vehicle 100 includes a fuel cell system 15 which is a driving power source, a vehicle-side connection part 120 that is provided in a vehicle body 110, and a power storage device 660. The fuel cell system 15 is a device that generates electric power which is used for a drive motor which is not illustrated and which is mounted in the fuel-cell vehicle 100. The fuel cell system 15 includes a fuel cell 600, a fuel gas supply system 200, an oxidant gas supply system 300, an exhaust gas system 400, a cooling system 500, and a control unit 650. The configurations of the fuel gas supply system 200, the oxidant gas supply system 300, and the exhaust gas system 400 which will be described later are merely examples, and it is only necessary that a fuel gas and an oxidant gas be supplied to the fuel cell 600.

The fuel cell 600 has a stack configuration in which a plurality of unit cells is stacked, is supplied with a fuel gas containing hydrogen and an oxidant gas containing oxygen, and generates electric power. The fuel cell 600 according to this embodiment is a solid polymer type fuel cell. In each unit cell of the fuel cell 600, a flow passage in which the fuel gas flows to an anode side (an anode-side flow passage) and a flow passage in which the oxidant gas flows to a cathode side (a cathode-side flow passage) are formed with an electrolyte membrane interposed therebetween. A refrigerant flow passage in which a refrigerant for cooling the fuel cell 600 flows is formed inside the fuel cell 600. The fuel cell 600 is not limited to a solid polymer type fuel cell, and other types of fuel cells such as a solid oxide type fuel cell may be employed.

The fuel gas supply system 200 includes a fuel gas tank 210, a fuel gas supply pipe 220, a fuel gas circulation pipe 230, and a hydrogen pump 290. The fuel gas tank 210 is a storage device in which hydrogen gas which is a fuel gas is stored and is connected to the fuel cell 600 via the fuel gas supply pipe 220. A flow rate of the fuel gas which is supplied from the fuel gas tank 210 to the fuel cell 600 is adjusted by a control valve (not illustrated) which is provided in the fuel gas supply pipe 220.

The fuel gas circulation pipe 230 is connected to the fuel cell 600 and the fuel gas supply pipe 220 and causes an anode exhaust gas discharged from the fuel cell 600 to the fuel gas supply pipe 220. The hydrogen pump 290 is provided in the fuel gas circulation pipe 230 to generate a driving force for causing the fuel gas to circulate in the flow passage and to adjust a flow rate of the fuel gas.

The fuel gas circulation pipe 230 is connected to a fuel gas discharge pipe 430 which will be described later via a purge valve 440 which will be described later. The anode exhaust gas includes impurities such as nitrogen and steam in addition to hydrogen which is not consumed in power generation. By opening the purge valve, the anode exhaust gas including impurities is discharged from the fuel gas circulation pipe 230 to the fuel gas discharge pipe 430.

The oxidant gas supply system 300 includes an air compressor 320 and an oxidant gas supply pipe 330. The fuel cell 600 in this embodiment uses air as the oxidant gas. The air compressor 320 compresses air which is suctioned from the outside of the fuel cell system 15 and supplies the compressed air to the cathode-side flow passage of the fuel cell 600 via the oxidant gas supply pipe 330.

The exhaust gas system 400 includes an exhaust gas pipe 410, a fuel gas discharge pipe 430, and a purge valve 440. The exhaust gas pipe 410 is a flow passage to which a cathode exhaust gas is discharged from the fuel cell 600. As described above, an end of the fuel gas discharge pipe 430 is connected to the fuel gas circulation pipe 230 via the purge valve 440 and the other end is connected to the exhaust gas pipe 410. Accordingly, hydrogen in the anode exhaust gas which is discharged from the fuel gas circulation pipe 230 via the purge valve 440 is diluted with the cathode exhaust gas before being discharged to the outside air.

The cooling system 500 includes a refrigerant supply pipe 515, a refrigerant discharge pipe 510, a refrigerant bypass pipe 550, a first pump 520, a second pump 525, a radiator 530, a heater 540, and switching valves 560 and 565. The refrigerant supply pipe 515 is a pipe for supplying a refrigerant to the fuel cell 600. The refrigerant discharge pipe 510 is a pipe that is used for discharging a refrigerant from the fuel cell 600. The refrigerant supply pipe 515 and the refrigerant discharge pipe 510 are called a "main flow passage." The radiator 530 for cooling the refrigerant is provided between a downstream part of the refrigerant discharge pipe 510 and an upstream part of the refrigerant supply pipe 515. A radiator fan 535 that promotes dissipation of heat from the radiator 530 is provided in the radiator 530. The second pump 525 that allows the refrigerant to flow to the refrigerant discharge pipe 510 is provided in the refrigerant discharge pipe 510. The second pump 525 adjusts a flow rate of the refrigerant flowing in the refrigerant discharge pipe 510 when the fuel cell 600 generates electric power.

Both ends of the refrigerant bypass pipe 550 are connected to the main flow passage. That is, one end of the refrigerant bypass pipe 550 is connected to the refrigerant supply pipe 515 and the other end is connected to the refrigerant discharge pipe 510. The first pump 520 that causes the refrigerant to flow to the refrigerant bypass pipe 550 and the heater 540 that heats the refrigerant flowing in the refrigerant bypass pipe 550 are provided in the refrigerant bypass pipe 550. The first pump 520 and the heater 540 are used to increase the temperature of the fuel cell 600 in advance when the fuel-cell vehicle 100 is started in a low-temperature environment as will be described later. In this embodiment, the first pump 520 has a lower drive voltage and a lower refrigerant flow rate at the time of drive than the second pump 525. The heater 540 can be a device that generates heat with supplied electric power and, for example, an electric heater can be used. As the heater 540, a ribbon heater which is wound around the refrigerant bypass pipe 550 when used may be employed. The refrigerant bypass pipe 550 is also referred to as a "bypass flow passage."

The switching valve 560 is provided in a branching part in which the refrigerant bypass pipe 550 branches from the refrigerant discharge pipe 510, and the switching valve 565 is provided in a branching part in which the refrigerant bypass pipe 550 branches from the refrigerant supply pipe 515. The switching valves 560 and 565 switch a flow of the refrigerant between the main flow passage including the refrigerant supply pipe 515 and the refrigerant discharge pipe 510 and the bypass flow passage. That is, the switching valves 560 and 565 can switch between a state in which the refrigerant flows via the radiator 530 and a state in which the refrigerant flows in the bypass flow passage without passing through the radiator 530. The switching valves 560 and 565 can change a ratio of a refrigerant flow rate passing through the radiator 530 and a refrigerant flow rate flowing in the bypass flow passage.

The switching valves 560 and 565 include an "attachment part" for attaching and detaching the first pump 520 and the heater 540 to and from the refrigerant flow passage. That is, the first pump 520 and the heater 540 can be easily attached and detached for each refrigerant bypass pipe 550 by attaching and detaching the refrigerant bypass pipe 550 to and from the main flow passage at the switching valves 560 and 565. Accordingly, the first pump 520 and the heater 540 can be added later to each refrigerant bypass pipe 550.

For example, a mixed solution of ethylene glycol and water (antifreeze) can be used as the refrigerant in the cooling system 500.

The control unit 650 is constituted by a microcomputer and includes a CPU, a ROM, a RAM, and an input and output port. The control unit 650 performs power generation control of the fuel cell system 15 and performs overall control of the fuel-cell vehicle 100. The control unit 650 acquires output signals of sensors which are provided in constituent parts of the fuel-cell vehicle 100. Examples of such sensors include sensors provided in constituent parts of the fuel cell system 15, an accelerator opening sensor, a brake pedal sensor, a shift position sensor, and a vehicle speed sensor. The control unit 650 outputs drive signals to constituent units associated with power generation, travel, or the like in the fuel-cell vehicle. Specifically, the control unit 650 outputs drive signals to, for example, the air compressor 320, pumps such as the hydrogen pump 290 and the second pump 525, and various valves. The control unit 650 performing the above-mentioned functions does not have to be constituted as a single control unit. For example, the control unit 650 may be constituted by a plurality of control units such as a control unit associated with the operation of the fuel cell system 15, a control unit associated with travel of the fuel-cell vehicle 100, a control unit that controls vehicle auxiliary machines not associated with travel, and the like and necessary information may be exchanged between the plurality of control units.

The vehicle-side connection part 120 is electrically connected to the heater 540 and the first pump 520 and is a structure for electrical connection to an external power source 700 which will be described later. The vehicle-side connection part 120 and the heater 540 are connected to each other via a line 130, and the vehicle-side connection part 120 and the first pump 520 are connected to each other via a line 140. The vehicle-side connection part 120 is also simply referred to as a "connection part."

The power storage device 660 can be constituted by, for example, a secondary battery such as a lithium ion battery or a nickel-hydride battery. The power storage device 660 may be a chargeable/dischargeable device other than a secondary battery and may be constituted by, for example, a capacitor. A drive motor (not illustrated) of the fuel-cell vehicle 100, fuel-cell auxiliary machines including the air compressor 320, the hydrogen pump 290, and the second pump 525, vehicle auxiliary machines not associated with power generation of the fuel cell 600, and the like are supplied with electric power from at least one of the fuel cell 600 and the power storage device 660.

B. Operation when System is Stopped

The heater 540 and the first pump 520 in this embodiment are provided to assist with a warming-up operation later and to rapidly increase the temperature of the fuel cell 600 by increasing the temperature of the fuel cell 600 in advance when the fuel-cell vehicle 100 is started in a low-temperature environment. A warming-up operation of the fuel cell 600 is an operation state in which a proportion of thermal energy in energy generated in the fuel cell 600 is increased by performing power generation at a lower efficiency than that in a normal operation using a method of curbing an amount of oxygen supplied to the fuel cell 600.

Figure 2:
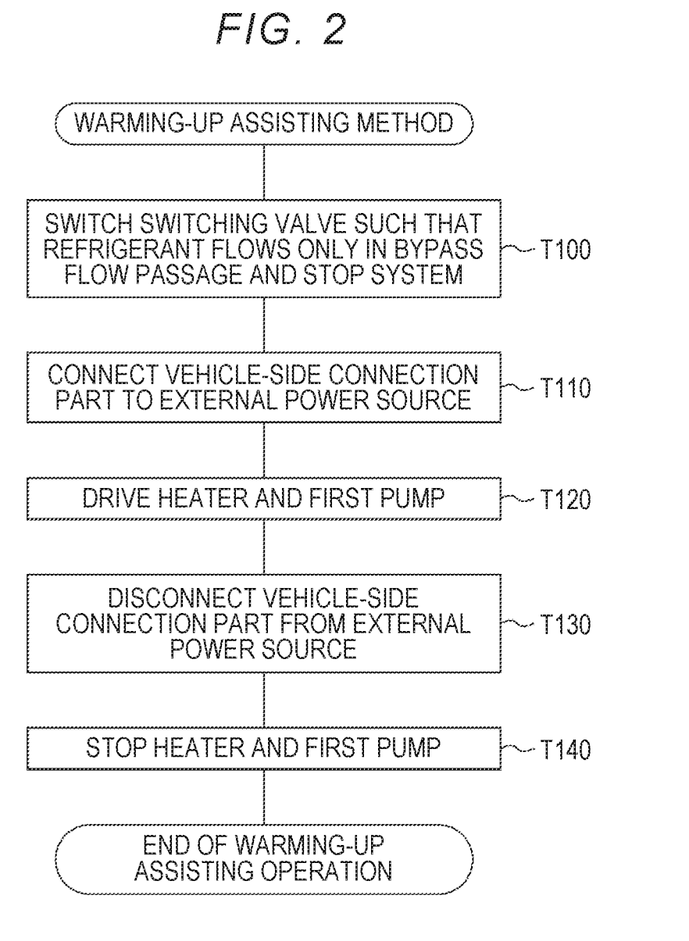
FIG. 2 is a flowchart illustrating a flow of operations which are performed by constituent units when a method of assisting with a warming-up operation is performed.

FIG. 2 is a flowchart illustrating a flow of operations which are performed in the fuel-cell vehicle 100 according to this embodiment and which are performed by the constituent units when a method of assisting with the warming-up operation of the fuel cell 600 is performed. The method of assisting with the warming-up operation illustrated in FIG. 2 is started when a start switch in the fuel-cell vehicle 100 is turned off and the fuel cell system 15 is stopped. In the fuel-cell vehicle 100 according to this embodiment, when the fuel cell system 15 is stopped, the switching valves 560 and 565 are switched by the control unit 650 such that the refrigerant flows in only the bypass flow passage and thus the system is stopped (Step T100). Some of the refrigerant flowing in the refrigerant flow passage may be caused to flow in the radiator 530, but it is preferable from the viewpoint of an increase in temperature of the fuel cell 600 that the switching valves 560 and 565 be switched such that all the refrigerant flows in the refrigerant bypass pipe 550. Thereafter, an operation of connecting the vehicle-side connection part 120 of the fuel-cell vehicle 100 to the external power source 700 is performed by a user of the vehicle or the like (Step T110).

In this embodiment, a commercial power source (for example, a power source of AC 100 V) is used as the external power source 700. A cable 710 which is a line for connecting the external power source 700 to the vehicle-side connection part 120 is provided in the external power source 700. A source-side connection part 720 is provided at an end of the cable 710. In Step T110, the source-side connection part 720 and the vehicle-side connection part 120 are connected to each other. One of each of the source-side connection part 720 and the vehicle-side connection part 120 may be constituted by a plug and the other end thereof may be constituted by a receptacle. In FIG. 1, the external power source 700 includes the cable 710, but the cable 710 may be provided on the fuel-cell vehicle 100 side. Alternatively, the vehicle-side connection part 120 and the external power source 700 may be connected to each other using a cable 710 which is prepared separately from the fuel-cell vehicle 100 and the external power source 700.

When the fuel cell system 15 is stopped, for example, the control unit 650 may acquire an outside air temperature from an outside air temperature sensor which is not illustrated and notify a user of the vehicle such that an operation of connecting the vehicle-side connection part 120 to the external power source 700 is performed when the outside air temperature is lower than a predetermined reference temperature. This notification can be performed such that notification content can be recognized, and for example, a device that performs display such that a user of the fuel-cell vehicle 100 can visually recognize it can be used therefor. A device that performs notification by sound may be used instead of the visible display or in addition to the visible display.

When the vehicle-side connection part 120 is connected to the external power source 700 as described above, electric power is supplied from the external power source 700 to the heater 540 and the first pump 520 via the vehicle-side connection part 120 and the heater 540 and the first pump 520 are driven (Step T120). Accordingly, the refrigerant flowing in the refrigerant bypass pipe 550 is heated by the heater 540 and the refrigerant circulates between the refrigerant bypass pipe 550 and the fuel cell 600. As a result, the fuel cell 600 can be warmed up by the heated refrigerant. By causing the refrigerant to circulate using the first pump 520, the fuel cell 600 can be heated using heat generated in the heater 540 even when the heater 540 is provided at a position separated from the fuel cell 600 in the refrigerant flow passage. In the fuel-cell vehicle 100 according to this embodiment, the above-mentioned heating is continuously performed when the fuel cell system 15 is stopped by connection to the external power source 700.

Thereafter, when a user of the fuel-cell vehicle 100 starts use of the vehicle, the vehicle-side connection part 120 and the external power source 700 are disconnected from each other by the user or the like (Step T130). That is, the source-side connection part 720 is detached from the vehicle-side connection part 120. As a result, supply of electric power from the external power source 700 to the heater 540 and the first pump 520 is cut off and the heater 540 and the first pump 520 are stopped (Step T140). Accordingly, the series of operations which are performed when the method of assisting with the warming-up operation of the fuel cell 600 is performed ends. In the fuel-cell vehicle 100 according to this embodiment, a warming-up operation is performed according to the temperature of the fuel cell 600, the outside air temperature, or the like.

In the fuel-cell vehicle 100 according to this embodiment having the above-mentioned configuration, the fuel cell 600 is heated by driving the heater 540 and the first pump 520 to heat the refrigerant using the external power source 700 before starting the fuel cell 600 in an environment with a low temperature such as a sub-zero temperature. That is, the temperature of the refrigerant is increased by driving the heater 540 and the refrigerant of which the temperature has been increased is caused to flow in the fuel cell 600 by driving the first pump 520, whereby the fuel cell 600 is heated. At this time, since the external power source 700 is used, heating of the refrigerant by the heater 540 and circulation of the refrigerant by the first pump 520 can be performed regardless of an SOC (a state of charge) of the power storage device 660 mounted in the fuel-cell vehicle 100 even when the fuel cell system 15 is stopped. Even in a low-temperature environment, the temperature of the fuel cell 600 can be kept higher while the system is stopped. Accordingly, the next time the start switch is turned on, it is possible to rapidly raise the temperature of the fuel cell 600 and start the fuel cell system 15 without any problem even in a low-temperature environment. Since electric power of the power storage device 660 does not have to be consumed to maintain the temperature of the fuel cell 600, it is possible to curb a shortage of electric power in the power storage device 660 when the start switch is turned on in a low-temperature environment and the warming-up operation of the fuel cell system 15 is performed. Accordingly, it is possible to prevent a warming-up operation from being stopped due to an SOC shortage of the power storage device 660 and to rapidly increase the temperature of the fuel cell 600.

Figure 3:
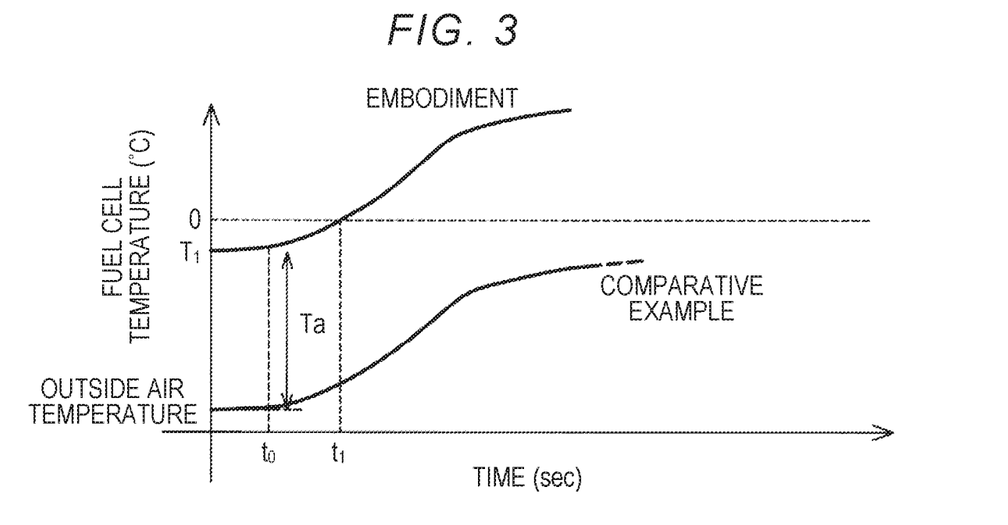
FIG. 3 is a diagram illustrating a scenario in which a temperature of a fuel cell increases when a fuel cell system is started.

FIG. 3 is a diagram illustrating a scenario in which the temperature of the fuel cell increases when the fuel cell system is started. In FIG. 3, a state in which a temperature increases when an operation of increasing the temperature of the fuel cell 600 in advance using the heater 540 and the first pump 520 is performed is illustrated as an embodiment and a state in which a temperature increases when the heater 540 and the first pump 520 are not used is illustrated as a comparative example. In FIG. 3, the horizontal axis represents time and the vertical axis represents a fuel cell temperature. In FIG. 3, a time at which the start switch of the fuel-cell vehicle 100 is turned on is indicated by time t0.

When the heater 540 and the first pump 520 are driven while the fuel cell system 15 is stopped as illustrated as an embodiment in FIG. 3, the fuel cell temperature is a temperature T1 which is higher than the outside air temperature by a temperature Ta at time t0 which is a start timing. For example, even in an extremely low-temperature environment in which the outside air temperature is −30° C., it is possible to maintain the refrigerant temperature at a relatively high temperature close to 0° C. while the fuel cell system 15 is stopped. Accordingly, when the start switch is turned on and the warming-up operation of the fuel cell 600 is started, the temperature of the fuel cell 600 can be rapidly increased and become equal to or higher than 0° C. at time t1 and the warming-up operation can be completed without difficulty, and thus normal power generation in which the fuel cell 600 generates electric power can be started in accordance with a load request.

On the other hand, when the heater 540 and the first pump 520 are not driven while the fuel cell system 15 is stopped as illustrated as a comparative example in FIG. 3, the fuel cell temperature is the same temperature as the outside air temperature at time t0 which is a starting time. When the start switch is turned on and the warming-up operation of the fuel cell 600 is started in this state, a longer time is required for increasing the temperature of the fuel cell 600 though heat is generated inside the fuel cell 600 through the warming-up operation. For example, even when time t1 has passed, the temperature of the fuel cell 600 cannot become higher than 0° C. When a longer time is required to increase the temperature of the fuel cell 600 in this way, the fuel-cell auxiliary machines consume electric power with the warming-up operation and thus there is a likelihood that the SOC of the power storage device 660 will decrease to curb progress of the warming-up operation. In this embodiment, by increasing the refrigerant temperature in the warming-up operation as illustrated in FIG. 3, it is possible to assist with the warming-up operation to rapidly increase the temperature of the fuel cell 600.

In the fuel-cell vehicle 100 according to this embodiment, the heater 540 and the first pump 520 can be easily attached to and detached from the switching valves 560 and 565 including the attachment part. Accordingly, in the fuel-cell vehicle, cold-area specifications with the heater 540 and the first pump 520 can be set and vehicles of a plurality of grades including cold-area specifications can be easily prepared. For example, a refrigerant bypass pipe 550 including the heater 540 and the first pump 520 and refrigerant bypass pipe 550 not including the heater 540 and the first pump 520 can be prepared and one refrigerant bypass pipe can be appropriately selected according to specifications requested by a client and be connected to the main flow passage. Specifically, in a vehicle of standard specifications in which starting in a low-temperature environment does not have to be considered, the refrigerant bypass pipe not including the heater 540 and the first pump 520 can be connected at the switching valves 560 and 565. Accordingly, since the heater 540 and the first pump 520 which are unnecessary are not provided in a vehicle which will not be used in a cold area, it is possible to reduce manufacturing costs. A function for assisting with a warming-up operation can be easily added to a vehicle which will be used in a cold area.

According to this embodiment, since the heater 540 and the first pump 520 are provided in the refrigerant bypass pipe 550, the refrigerant can be caused to flow by bypassing the radiator 530 when the refrigerant is heated using the heater 540. Accordingly, it is possible to prevent the refrigerant heated by the heater 540 from being cooled in the radiator 530 and to enhance efficiency of heating the refrigerant while the system is stopped. Since the heater 540 and the first pump 520 are provided in the refrigerant bypass pipe 550, it is possible to prevent the refrigerant from flowing in the refrigerant bypass pipe 550 at the time of power generation in the fuel cell 600 by causing the control unit 650 to switch the switching valves 560 and 565. Since the external power source 700 and the vehicle-side connection part 120 are disconnected from each other when the fuel-cell vehicle 100 is started, the heater 540 and the first pump 520 are stopped at the time of power generation in the fuel cell 600. When the refrigerant flows in the refrigerant bypass pipe 550 in this state, the first pump 520 in a stopped state can cause flow passage resistance and thus power consumption of the second pump 525 which is driven at the time of power generation of the fuel cell 600 can be increased. In this embodiment, since flowing of the refrigerant in the refrigerant bypass pipe 550 is curbed at the time of power generation of the fuel cell 600 while the first pump 520 is stopped, it is possible to curb a decrease in energy efficiency due to an increase in power consumption of the second pump 525.

In the fuel-cell vehicle 100 according to this embodiment, the heater 540 and the first pump 520 are driven using a commercial power source as the external power source 700. Accordingly, it is possible to easily secure a power source of the heater 540 and the first pump 520 which are used when the system is stopped. For example, a power source for a block heater which is widely used in cold areas for a vehicle with an internal combustion engine may be used as the external power source 700. Since a power source such as a commercial power source of which an output voltage is lower than an operating voltage of fuel-cell auxiliary machines such as the second pump 525 is used as the external power source 700, it is possible to curb a voltage of a line that connects the vehicle-side connection part 120 of the fuel-cell vehicle 100 to the external power source 700. Accordingly, it is possible to curb power consumption of the external power source 700 and to allow a refrigerant to flow in the refrigerant flow passage using the first pump 520. In addition, it is possible to enhance safety of the operation of connecting the vehicle-side connection part 120 to the external power source 700.

Since the heater 540 and the first pump 520 in this embodiment are supplied with electric power from the external power source 700 via the vehicle-side connection part 120, an electrical line for supplying electric power to the heater 540 and the first pump 520 is independent of other devices which are mounted in the fuel-cell vehicle 100. Accordingly, it is possible to easily perform electrical connection to the vehicle-side connection part 120 without being affected by other electrical devices which are mounted in the vehicle. It is possible to appropriately select the heater 540 and the first pump 520 without being affected by other electrical devices mounted in the vehicle and types of power sources mounted in the vehicle. For example, a fuel-cell auxiliary machine such as the air compressor 320 or the second pump 525 which is supplied with electric power from the fuel cell 600 or the power storage device 660 is driven with a DC current with a relatively high voltage of about 300 V. On the other hand, devices which are driven with an AC current with a relatively low voltage which is supplied from a commercial power source such as the external power source 700 can be selected as the heater 540 and the first pump 520. Accordingly, it is possible to curb an increase in size of the system due to provision of the heater 540 and the first pump 520.

C. Other Embodiments (C1) In the above embodiment, drive of the heater 540 and the first pump 520 is started by connecting the vehicle-side connection part 120 of the fuel-cell vehicle 100 to the external power source 700 and the heater 540 and the first pump 520 are stopped by cutting off the connection, but another configuration may be employed. For example, the control unit 650 may acquire a connection state between the vehicle-side connection part 120 and the external power source 700, the temperature of the fuel cell 600, the outside air temperature, an elapsed time since the fuel cell system 15 has been stopped, and the like and drive the heater 540 and the first pump 520 when a predetermined condition is satisfied. That is, when it is determined that the temperature of the fuel cell 600 has decreased to the extent that a warming-up operation at the time of starting is hindered after the fuel cell system 15 has been stopped, driving of the heater 540 and the first pump 520 may be started. For example, when the elapsed time since the fuel cell system 15 has been stopped is greater than a predetermined reference time in a state in which the vehicle-side connection part 120 is connected to the external power source 700, drive of the heater 540 and the first pump 520 may be started. Alternatively, when the outside air temperature or the temperature of the fuel cell 600 with the system stopped is equal to or less than a predetermined reference temperature in a state in which the vehicle-side connection part 120 is connected to the external power source 700, drive of the heater 540 and the first pump 520 may be started. With this configuration, the same advantages as in the above-mentioned embodiment can also be obtained.

(C2) In the above embodiment, the heater 540 and the first pump 520 are driven after the fuel cell system 15 has been stopped and until the next time the start switch is turned, but another configuration may be employed. For example, when the start switch is turned on in a low-temperature environment, supply of electric power to the heater 540 and the first pump 520 may be performed. In this case, a warming-up operation of the fuel cell 600 may be started after the temperature of the fuel cell 600 is increased to a certain extent by driving the heater 540 and the first pump 520, or driving of the heater 540 and the first pump 520 and the warming-up operation of the fuel cell 600 may be started at the same time. With this configuration, the same advantage of assisting with the warming-up operation by heating the refrigerant using the heater 540 to rapidly increase the temperature of the fuel cell 600 can be obtained. When driving of the heater 540 and the first pump 520 is performed at the same time as the warming-up operation, control in which the second pump 525 is not used is possible during the warming-up operation and thus it is possible to curb a decrease in SOC of the power storage device 660 due to driving of the second pump 525 during the warming-up operation.

(C3) In the above embodiment, the heater 540 and the first pump 520 are supplied with electric power from the common vehicle-side connection part 120, but another configuration may be employed. That is, in the fuel-cell vehicle 100, a connection part for supplying electric power to the heater 540 and a connection part for supplying electric power to the first pump 520 may be separately provided and the external power source 700 may be connected to the connection parts.

(C4) In the above embodiment, the heater 540 and the first pump 520 are provided in the bypass flow passage, but another configuration may be employed. For example, the heater 540 and the first pump 520 may be provided in the main flow passage for allowing the refrigerant to circulate between the fuel cell 600 and the radiator 530. Alternatively, the heater 540 and the first pump 520 may be provided in an independent refrigerant flow passage which is not connected to the main flow passage in which the refrigerant for cooling the fuel cell 600 during power generation of the fuel cell 600 flows. As long as the refrigerant heated by the heater 540 can be caused to flow into the fuel cell 600 using the external power source during stopping of the fuel cell system 15, it is possible to obtain the same advantage of rapidly increasing the temperature of the fuel cell 600 at the time of starting by curbing a decrease in temperature of the refrigerant in a low-temperature environment.

(C5) In the above embodiment, the heater 540 and the first pump 520 are provided separately, but they may be provided as a unified body. For example, the heater 540 may be disposed in the first pump 520. Alternatively, when an amount of heat is sufficiently great at the time of driving the first pump 520, the first pump 520 for causing the refrigerant to circulate may be used as a heater for heating the refrigerant. For example, when an amount of applied heat in a temperature balance of the refrigerant is less than an amount of radiated heat after the fuel cell system 15 has been stopped, heat of the fuel cell 600 is taken away to the refrigerant by causing the refrigerant to circulate and a rate of decrease in temperature of the fuel cell 600 after the system has been stopped increases. Here, when an amount of heat generated at the time of driving of a pump is greater than an amount of heat radiated from the refrigerant, it is possible to obtain the same advantage that a decrease in temperature of the fuel cell 600 can be curbed by driving the pump such that the refrigerant circulates and the temperature of the fuel cell 600 can be increased the next time the system is started to rapidly increase the temperature of the fuel cell 600.

(C6) In the above embodiment, the attachment part for attaching and detaching the heater 540 and the first pump 520 to and from the refrigerant flow passage is provided in the switching valves 560 and 565 for switching the refrigerant flow between the main flow passage of the refrigerant and the bypass flow passage, but the attachment part may be provided in a structure other than the switching valves. In the above embodiment, the attachment part is provided in the branching part in which the bypass flow passage branches from the main flow passage of the refrigerant, but it may be provided in another place. By providing the attachment part for attaching and detaching the heater 540 and the first pump 520 to and from the refrigerant flow passage, the same advantage that vehicles of a plurality of grades including cold-area specifications can be easily prepared can be obtained. The attachment part may not be provided. In this case, the same advantage that the temperature of the fuel cell 600 can be rapidly increased at the time of starting at a low temperature by curbing a decrease in temperature of the refrigerant in a low-temperature environment is obtained as long as the heater 540 and the first pump 520 which are driven with the external power source 700 are provided.

(C7) In the above embodiment, a commercial power source is used as the external power source 700, but another configuration may be employed. For example, various power sources such as a solar panel and a stationary fuel-cell device can be used as the external power source 700. In the above embodiment, in which a commercial power source is used as the external power source 700, the output voltage of the external power source 700 is lower than the operating voltage of the fuel-cell auxiliary machine such as the second pump 525 which is supplied with electric power from the fuel cell 600 or the power storage device 660, but another configuration may be employed. Here, in view of increasing safety of the operation of connecting the vehicle-side connection part 120 of the fuel-cell vehicle 100 to the external power source 700, it is preferable that the output voltage of the external power source 700 below.

The disclosure is not limited to the above embodiments and can be embodied in various forms without departing from the gist of the disclosure. For example, technical features of the embodiments corresponding to technical features of the aspects described in the SUMMARY can be appropriately exchanged or combined to solve some or all of the above-mentioned problems or to achieve some or all of the above-mentioned advantages. The technical features can be appropriately deleted as long as they are not described as being essential in this specification.

What is claimed is:

1. A fuel-cell vehicle in which a fuel cell which is a driving power source is mounted, the fuel-cell vehicle comprising:
  a refrigerant flow passage that is connected to the fuel cell;
  a first pump that causes a refrigerant to flow in the refrigerant flow passage;
  a heater that heats the refrigerant;
  a radiator that cools the refrigerant;
  a power storage device that is chargeable and dischargeable;
  a second pump that is supplied with electric power from at least one of the power storage device or the fuel cell and that causes the refrigerant to flow in the refrigerant flow passage; and
  a connection part that is electrically connected to the heater and the first pump and that is used for electrical connection to an external power source which is provided outside the fuel-cell vehicle,
  wherein the heater and the first pump are driven with electric power supplied from the external power source which is connected thereto via the connection part;
  wherein the refrigerant flow passage includes:
    a main flow passage that causes the refrigerant to circulate between the fuel cell and the radiator; and
    a bypass flow passage of which both ends are connected to the main flow passage, which causes the refrigerant to flow by bypassing the radiator, and in which the heater and the first pump are provided;
  wherein an output voltage of the external power source is lower than an operating voltage of the second pump.

2. The fuel-cell vehicle according to claim 1, wherein the first pump and the heater are provided in the refrigerant flow passage with an attachment part provided in the refrigerant flow passage.

3. The fuel-cell vehicle according to claim 2, wherein the attachment part is provided in a branching part at which the bypass flow passage branches from the main flow passage.

4. The fuel-cell vehicle according to claim 3, wherein the attachment part is provided in a switching valve that switches a flow of the refrigerant between the main flow passage and the bypass flow passage.

5. The fuel-cell vehicle according to claim 1, wherein the external power source is a commercial power source.

* * * * *